United States Patent
Yang

(10) Patent No.: US 11,769,898 B2
(45) Date of Patent: Sep. 26, 2023

(54) DEVICE FOR MANUFACTURING ELECTRODE ASSEMBLY WITH AIR PURIFYING FUNCTION

(71) Applicant: LG CHEM, LTD., Seoul (KR)

(72) Inventor: Sung Hwan Yang, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 237 days.

(21) Appl. No.: 16/971,184

(22) PCT Filed: Jul. 9, 2019

(86) PCT No.: PCT/KR2019/008434
§ 371 (c)(1),
(2) Date: Aug. 19, 2020

(87) PCT Pub. No.: WO2020/017809
PCT Pub. Date: Jan. 23, 2020

(65) Prior Publication Data
US 2021/0101159 A1   Apr. 8, 2021

(30) Foreign Application Priority Data

Jul. 17, 2018   (KR) .......................... 10-2018-0082777

(51) Int. Cl.
*H01M 10/04*   (2006.01)

(52) U.S. Cl.
CPC . *H01M 10/0409* (2013.01); *B65H 2301/5115* (2013.01)

(58) Field of Classification Search
None
See application file for complete search history.

(56) References Cited

U.S. PATENT DOCUMENTS

| 6,019,848 A * | 2/2000 | Frankel ............... C23C 16/455 |
| | | 118/715 |
| 6,203,600 B1 | 3/2001 | Loreth |
| 2014/0201983 A1 | 7/2014 | Song et al. |
| 2015/0086866 A1* | 3/2015 | Park ................... H01M 10/052 |
| | | 429/211 |
| 2015/0298338 A1 | 10/2015 | Yanagi et al. |

(Continued)

FOREIGN PATENT DOCUMENTS

| CN | 1221358 A | 6/1999 |
| CN | 202962974 U | 6/2013 |
| CN | 105797853 A | 7/2016 |

(Continued)

OTHER PUBLICATIONS

Supplementary European Search Report issued in EP 19 83 8168, dated Mar. 17, 2021.

(Continued)

*Primary Examiner* — Carmen V Lyles-Irving
(74) *Attorney, Agent, or Firm* — Birch, Stewart, Kolasch & Birch, LLP

(57) ABSTRACT

A device for manufacturing an electrode assembly for removing foreign particles through air is provided. The device includes a winding portion; an electrode transfer line; an air blower installed on a top portion of the device and blowing air to a bottom portion of the device; and an outlet for discharging air moved to the bottom portion by the air blower.

9 Claims, 8 Drawing Sheets

(56) References Cited

U.S. PATENT DOCUMENTS

2017/0260388 A1    9/2017  Ryoo et al.
2018/0080711 A1    3/2018  Ho et al.

FOREIGN PATENT DOCUMENTS

| CN | 107109028 A | 8/2017 |
| CN | 107403962 A | 11/2017 |
| CN | 206758566 U | 12/2017 |
| CN | 108172910 A | 6/2018 |
| JP | 11-329416 A | 11/1999 |
| JP | 2000-30700 A | 1/2000 |
| JP | 2004-195399 A | 7/2004 |
| JP | 2009-252467 A | 10/2009 |
| JP | 2018-18681 A | 2/2018 |
| KR | 20-0215592 Y1 | 3/2001 |
| KR | 10-0538137 B1 | 2/2006 |
| KR | 10-2014-0094908 A | 7/2014 |
| KR | 10-1475429 B1 | 12/2014 |
| KR | 10-2016-0012534 A | 2/2016 |
| KR | 10-2017-0107319 A | 9/2017 |
| KR | 10-2018-0079841 A | 7/2018 |
| WO | WO 2018/025785 A1 | 2/2018 |
| WO | WO 2018/038435 A1 | 3/2018 |

OTHER PUBLICATIONS

International Search Report issued in PCT/KR2019/008434, (PCT/ISA/210), dated Oct. 30, 2019.

\* cited by examiner

DEVICE FOR MANUFACTURING ELECTRODE ASSEMBLY WITH AIR PURIFYING FUNCTION

TECHNICAL FIELD

This application claims priority to and the benefit of Korean Patent Application No. 10-2018-0082777 filed in the Korean Intellectual Property Office on Jul. 17, 2018, the entire contents of which are incorporated herein by reference.

The present invention relates to a device for manufacturing an electrode assembly with an air purifying function.

BACKGROUND ART

Recently, price rise of energy sources caused by exhaustion of fossil fuels, and environmental contamination, have intensified, and demands for environmentally-friendly alternative sources of energy are becoming basic essentials for future life. Accordingly, studies on various electric power generating methods such as nuclear energy, solar power, wind power, and tidal power are in progress, and huge interest in electric power storing devices for more efficiently using energy produced in this way continues.

Further, as technical developments and demands on mobile devices and cell vehicles increase, demands for batteries as an energy source substantially increase, and accordingly, many studies on batteries for satisfying various kinds of demands are currently being performed. Particularly, in the viewpoint of materials, there are high demands on lithium rechargeable batteries such as a lithium ion battery or a lithium ion polymer battery having merits including high energy density, a good discharging voltage, and output stability.

The rechargeable batteries are classified depending on the structures of an electrode assembly in which a positive electrode, a negative electrode, and a separation film provided between the positive electrode and the negative electrode are stacked. Typical ones include a jelly roll type (winding type) of electrode assembly in which a long sheet type of positive electrode and negative electrode are wound while a separation film is provided, and a stacking type of electrode assembly in which a plurality of positive electrodes and negative electrodes cut to a predetermined size of unit are sequentially stacked while a separation film is provided, and recently, in order to solve the drawbacks of the jelly roll type of electrode assembly and the stacking type of electrode assembly, a stacking/folding type of electrode assembly in which unit cells in which positive electrodes and negative electrodes with a predetermined size are stacked while a separation film is provided are sequentially wound while provided on a separation film as an electrode assembly with an advanced structure that is a mixture of the jelly roll type and the stacking type is being developed.

Among the electrode assemblies, the jelly roll type of electrode assembly has merits of easy manufacturing and high energy density per weight, so it is used as an energy source to various kinds of devices from laptop computers to cell vehicles.

FIG. 1 shows a front view of a conventional device for manufacturing a jelly roll type of electrode assembly. FIG. 2 shows a top plan view of a device for manufacturing an electrode assembly of FIG. 1.

Referring to FIG. 1 and FIG. 2, a positive electrode 11, a negative electrode 12, and a separation film 13 are wound by a winding portion 14, so they are made into a jelly roll shape.

In this instance, when foreign particles are input to the positive electrode 11, the negative electrode 12, and a surface of the separation film 13 and are then wound altogether, drawbacks such as a low voltage or a short circuit are generated, so the device 10 for manufacturing an electrode assembly is operated in a space for closing and sealing out external air.

However, the device 10 for manufacturing an electrode assembly includes various installations such as an electrode transfer line 19, an electrode coalescing unit 15, an electrode incising unit 20, a power transmitter 17 (shown in FIG. 2), and a power supply 18 (shown in FIG. 2) in addition to the winding portion 14, and various foreign particles are generated by operation of the installations. When the foreign particles are input into the winding portion 14 and the foreign particles remain on the positive electrode 11, the negative electrode 12, and the surface of the separation film 13, the foreign particles are wound together with the positive electrode 11, the negative electrode 12, and the separation film 13, thereby causing problems such as the above-noted low voltage and the short circuit.

Further, the foreign particles generated by the operation of the power transmitter 17 (shown in FIG. 2) and the power supply 18 (shown in FIG. 2) provided on a rear side of the device 10 for manufacturing an electrode assembly pass through a base hole 16 and are input to the winding portion 14. To solve the problems, a method for installing an air blower at the front of the device 10 for manufacturing an electrode assembly, blowing air toward the rear side, and thus preventing foreign particles from being input to a front portion may be considered, but in this case, a moving line of a worker is disturbed, and provision of materials is difficult, so it is undesirable to install the air blower on the front side of the manufacturing device 10.

Therefore, there is a need for skills for fundamentally solving the problem.

DISCLOSURE

Technical Problem

An object of the present invention is to solve the problems of the prior art and technical problems from the past.

The inventors of the present invention, having performed in-depth research and experimentation, confirmed prevention of foreign particles from being input to a winding portion by installing an air blower in a top portion of a device for manufacturing an electrode assembly, and installing an outlet in a lateral bottom end portion of the device for manufacturing an electrode assembly, and completed the present invention.

Technical Solution

An exemplary embodiment of the present invention provides a device for manufacturing an electrode assembly for removing foreign particles through air circulation, the device including: a winding portion; an electrode transfer line; an air blower installed at a top portion of the device and configured to blow air to a bottom portion of the device; and an outlet configured to discharge air blown to the bottom portion by the air blower.

The air blower may be installed in a transfer direction of the electrode transfer line.

At least one additional air blower may be installed to overlap the air blower in a direction crossing a transfer direction of the electrode transfer line and above the winding portion.

The outlet may be installed below the electrode transfer line.

The outlet may be installed at a lateral bottom end portion of the device.

Another embodiment of the present invention provides a system for manufacturing and installing an electrode assembly, the system including the device for manufacturing the electrode assembly described above and provided in plurality, wherein the plurality of devices for manufacturing the electrode assembly includes a first device for manufacturing a first electrode assembly and a second device for manufacturing a second electrode assembly, and the first device and the second device are installed to face each other.

The air blower of the first device is configure to blow air to the winding portion of the first device and the air blower of the second device is configured to blow air to the winding portion of the second device may be installed to face each other at a front of the first and second devices, respectively.

At least one additional air blower may be installed to overlap the air blower of the first device and the air blower of the second device in a direction crossing a transferring direction of the electrode transfer line of the first device and a transferring direction of the electrode transfer line of the second device.

An outlet may be installed on respective sides of a space between the first device and the second device.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Unless explicitly described to the contrary, the word "comprise" and variations such as "comprises" or "comprising" will be understood to imply the inclusion of stated elements but not the exclusion of any other elements.

Further, in the specification, the phrase "on a plane" means viewing the object portion from the top, and the phrase "in a front view" means viewing a cross-section of which the object portion is visible from the front.

Figure 1:
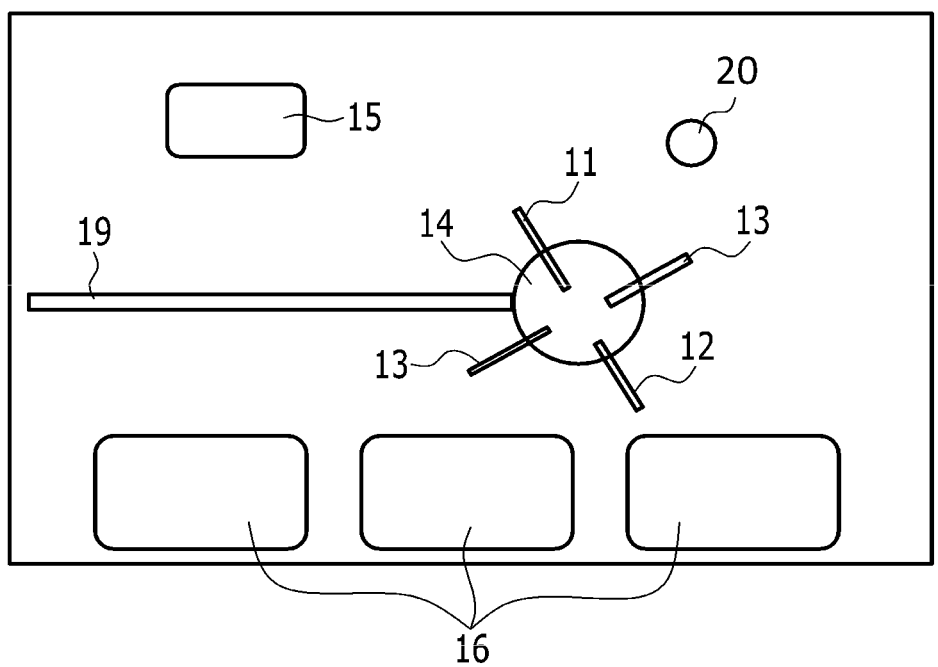
FIG. 1 shows a front view of a conventional device for manufacturing a jelly roll type of electrode assembly.
Figure 2:
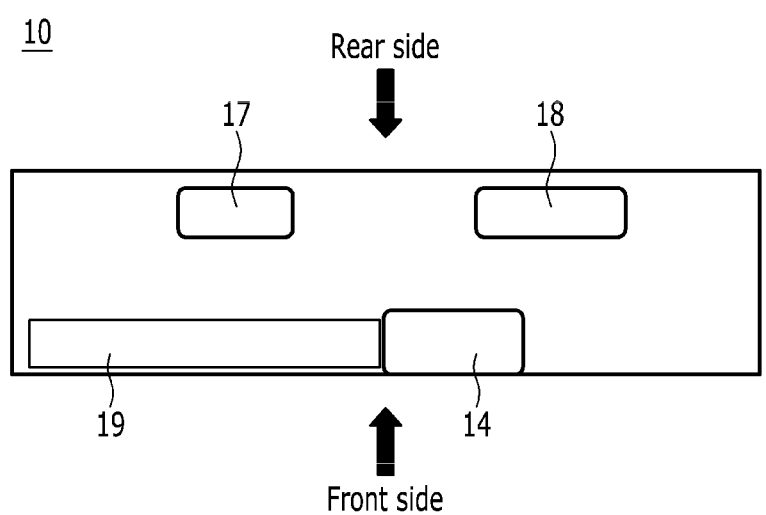
FIG. 2 shows a top plan view of a device for manufacturing an electrode assembly of FIG. 1.
Figure 3:
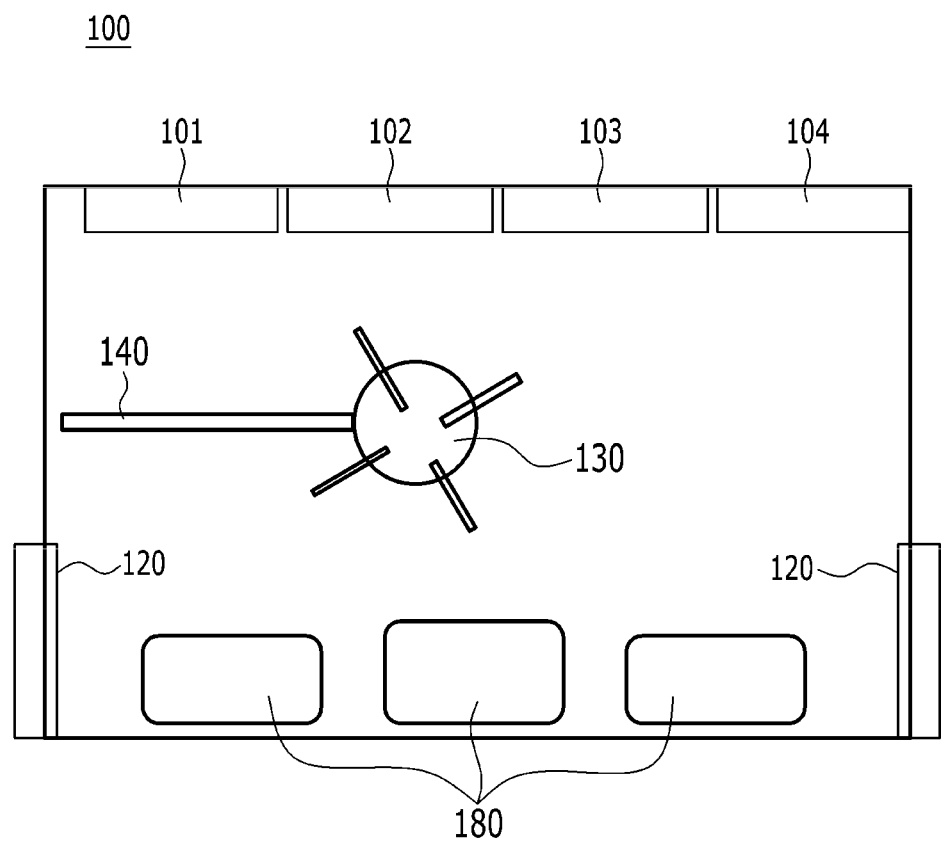
FIG. 3 shows a front view of a device for manufacturing an electrode assembly according to an exemplary embodiment of the present invention.
Figure 4:
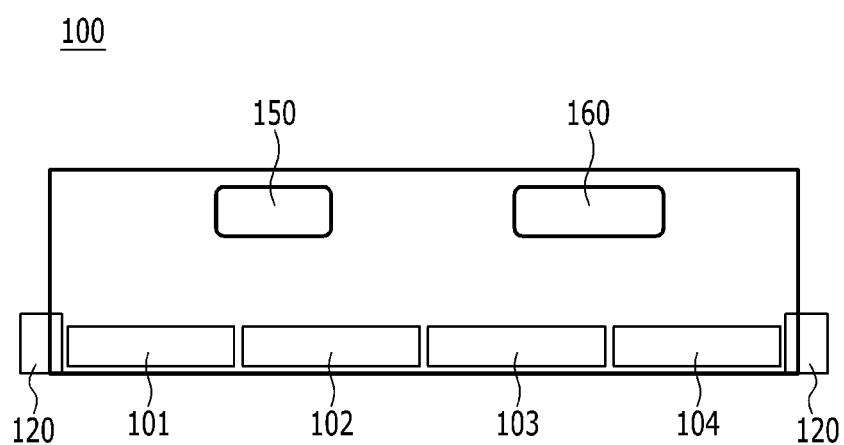
FIG. 4 shows a top plan view of a device for manufacturing an electrode assembly of FIG. 3.

FIG. 3 shows a front view of a device for manufacturing an electrode assembly according to an exemplary embodiment of the present invention. FIG. 4 shows a top plan view of a device for manufacturing an electrode assembly of FIG. 3.

Referring to FIG. 3 and FIG. 4, the device 100 for manufacturing an electrode assembly includes a winding portion 130, an electrode transfer line 140, air blowers 101, 102, 103, and 104, and an outlet 120. The air blowers 101, 102, 103, and 104 are installed on a top portion of the device 100 for manufacturing an electrode assembly, and blow air to a bottom portion of the device 100 for manufacturing an electrode assembly. The outlet 120 is installed in a lateral bottom end of the device 100 for manufacturing an electrode assembly so the air blown by the air blowers 101, 102, 103, and 104 is discharged with foreign particles. For ease of description, regarding the device 100 for spirally winding an electrode assembly, equipment such as an electrode fusion unit or an electrode inciser is not shown but is simplified. Here, regarding a top portion and a bottom portion of the device 100 for manufacturing an electrode assembly, a portion where the device 100 for manufacturing an electrode assembly contacts a ground side may be referred to as the bottom portion, and a portion corresponding to the bottom portion of the manufacturing device 100 in an opposite direction to that of gravity may be referred to as the top portion.

The air blowers 101, 102, 103, and 104 are installed in a direction in which the electrode transfer line 140 is transferred to prevent the foreign particles from arriving at the electrode by the air blown by the air blowers 101, 102, 103, and 104. Further, air cleanness around the winding portion 130 may be increased by mainly disposing the air blowers 101, 102, 103, and 104 on the top portion of the device 100 for manufacturing an electrode assembly corresponding to a position of the winding portion 130. In detail, at least one air blower 102 may be additionally disposed so that it may be provided on a same plane as the air blowers 101, 102, 103, and 104 and it may overlap the air blower 102 in a direction crossing a direction in which the electrode transfer line 140 is transferred.

Further, the outlet 120 may be installed below the electrode transfer line 140 to prevent the foreign particles from being input to the electrode transfer line 140 and the winding portion 130. Particularly, the foreign particles generated by a power transmitter 150 and a power supply 160 installed on the rear side portion of the device 100 for manufacturing an electrode assembly may be prevented from being input to the electrode transfer line 140 and the winding portion 130 through an installing base hole 180. Here, a rear side of the device 100 for manufacturing an electrode assembly may be a side corresponding to the front side of the device 100 for manufacturing an electrode assembly when the device 100 for manufacturing an electrode assembly is seen from the rear side.

Figure 5:
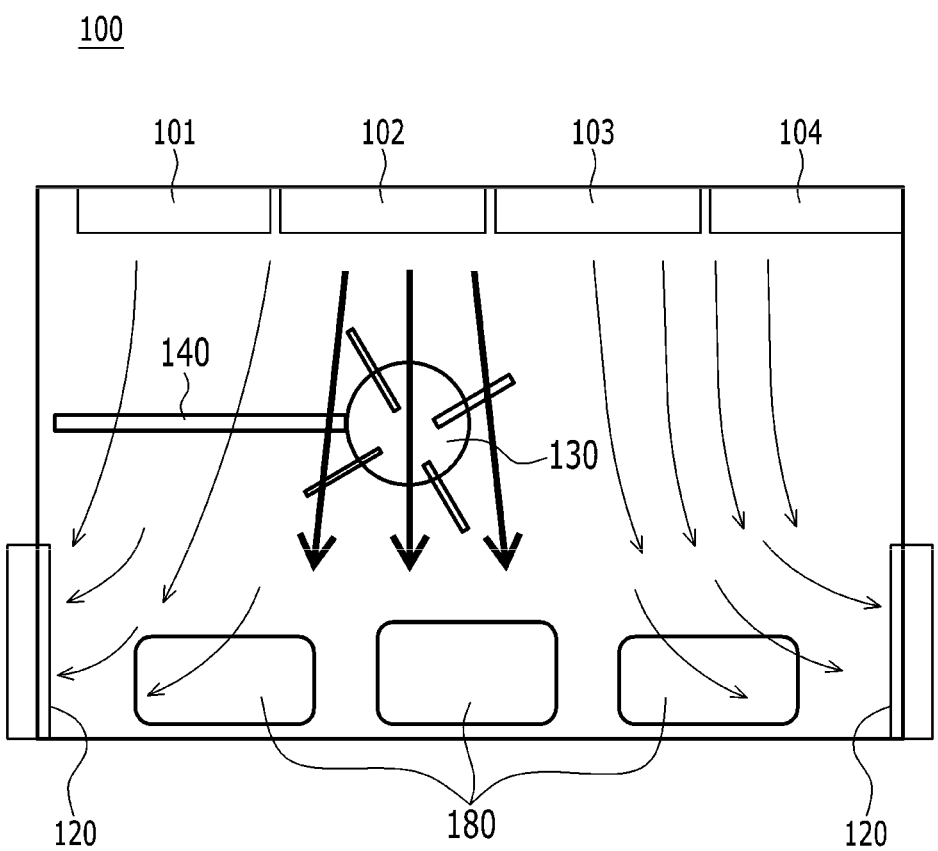
FIG. 5 shows a front view of a flow of air in a device for manufacturing an electrode assembly of FIG. 3.

FIG. 5 shows a front view of a flow of air in a device for manufacturing an electrode assembly of FIG. 3.

Referring to FIG. 3 and FIG. 5, arrows indicate flows of air. The air blown by the air blowers 101, 102, 103, and 104 moves to the bottom portion of the device 100 for spirally winding an electrode assembly to the top portion thereof and is then discharged to the outlet 120 installed in the lateral bottom end of the device 100 for manufacturing an electrode assembly.

The air blower 102 for blowing air toward the winding portion 130 may prevent foreign particles from being input to the winding portion 130 by blowing air with a relatively high flow rate.

The air blowers 101, 102, 103, and 104 may blow dry air by including a moisture controlling function, and may include a filter function for filtering out foreign particles. Particularly, the air blowers 101, 102, 103, and 104 may include a wind direction controlling function so that the air blown to the bottom portion of the device 100 for manufacturing an electrode assembly to the top portion thereof may be discharged to the outlet 120. Further, the air blowers 101, 102, 103, and 104 include a wind speed controlling function to prevent foreign particles from being input to a specific part of the device 100 for manufacturing an electrode assembly by blowing air with a relative high wind speed to the specific part. The air blowers 101, 102, 103, and 104 are not specifically limited when they include the above-noted functions, and for example, an equipment fan filter unit may be used.

Figure 6:
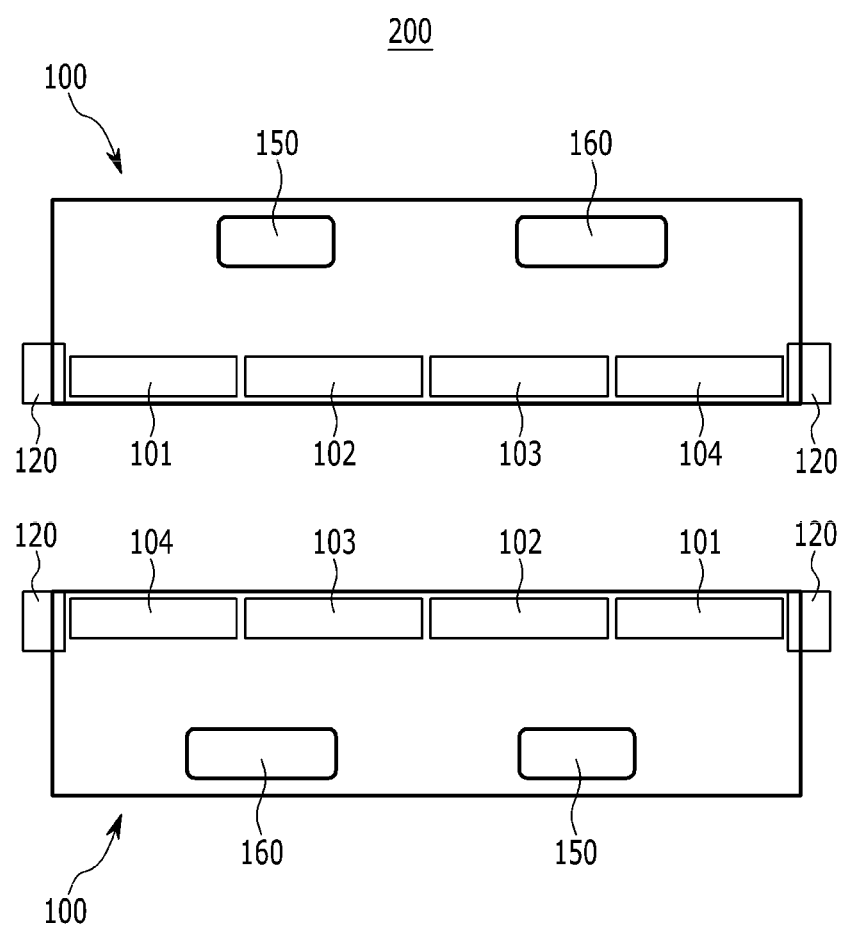
FIG. 6 shows a top plan view of a system for manufacturing and installing an electrode assembly in which two units of a device for manufacturing an electrode assembly are provided to face each other according to FIG. 3.

FIG. 6 shows a top plan view of a system for manufacturing and installing an electrode assembly in which two units of a device for manufacturing an electrode assembly are provided to face each other according to FIG. 4.

Referring to FIG. 4 and FIG. 6, the system for manufacturing and installing an electrode assembly includes two devices 100 for manufacturing an electrode assembly, and the two devices 100 for manufacturing an electrode assembly are installed in a same space to face each other. In this case, a range in which the air blowers 101, 102, 103, and 104 of the respective units are applied overlaps a space between the two devices 100 for manufacturing an electrode assembly, thereby increasing an air circulation effect. Further, in the space between the two devices 100 for manufacturing an electrode assembly, an operator may simultaneously manage the two devices 100 for manufacturing an electrode assembly, and may efficiently use the space in which the two devices 100 for manufacturing an electrode assembly are installed.

Figure 7:
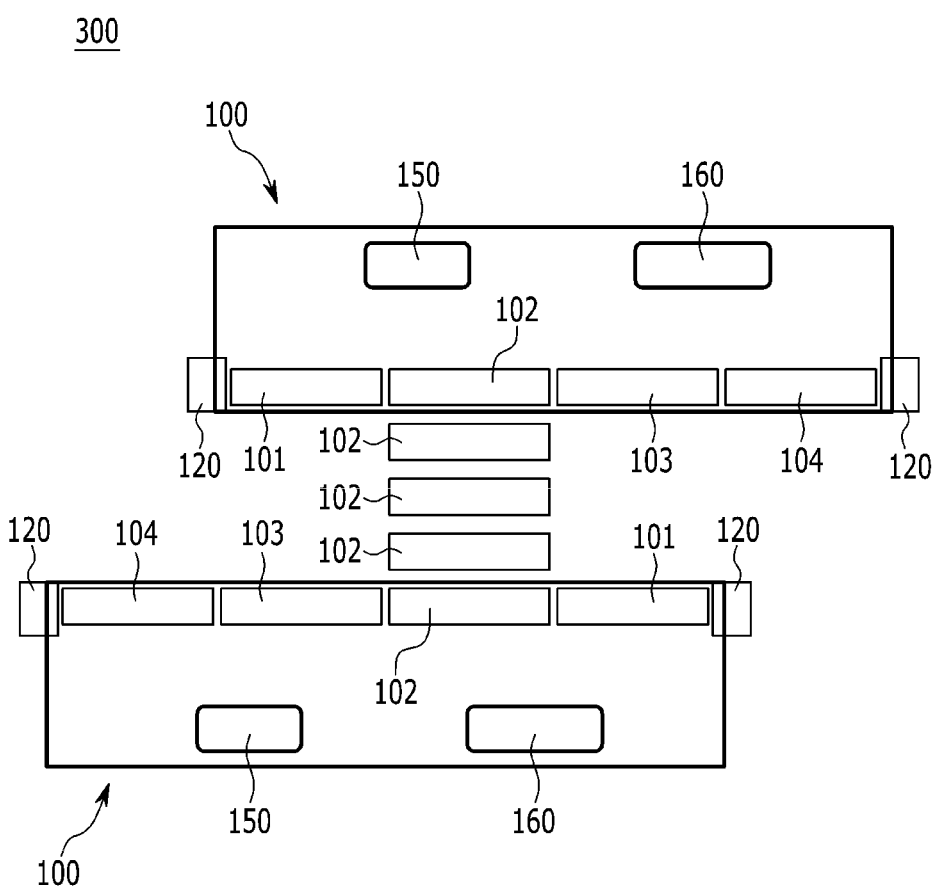
FIG. 7 shows a top plan view of an exemplary variation of FIG. 6.

FIG. 7 shows a top plan view of an exemplary variation of FIG. 6.

Referring to FIG. 3, FIG. 6, and FIG. 7, regarding a system 300 for manufacturing and installing an electrode assembly, the two devices 100 for manufacturing an electrode assembly are installed in the same space to face each other, and the air blowers 102 for blowing air to the winding portion 130 are installed to face each other at the front. Air blowers 102 are additionally installed in the space between the air blowers 102 facing each other. In detail, at least one air blower 102 may be additionally disposed so that it may be provided on a same plane as the air blowers 101, 102, 103, and 104 and it may overlap the air blower 102 in a direction crossing a direction in which the electrode transfer line 140 is transferred.

By the above-described structure, the air blown by the air blowers 102 may be gathered on the winding portion 130 to thereby increase air purity around the winding portion 130.

Figure 8:
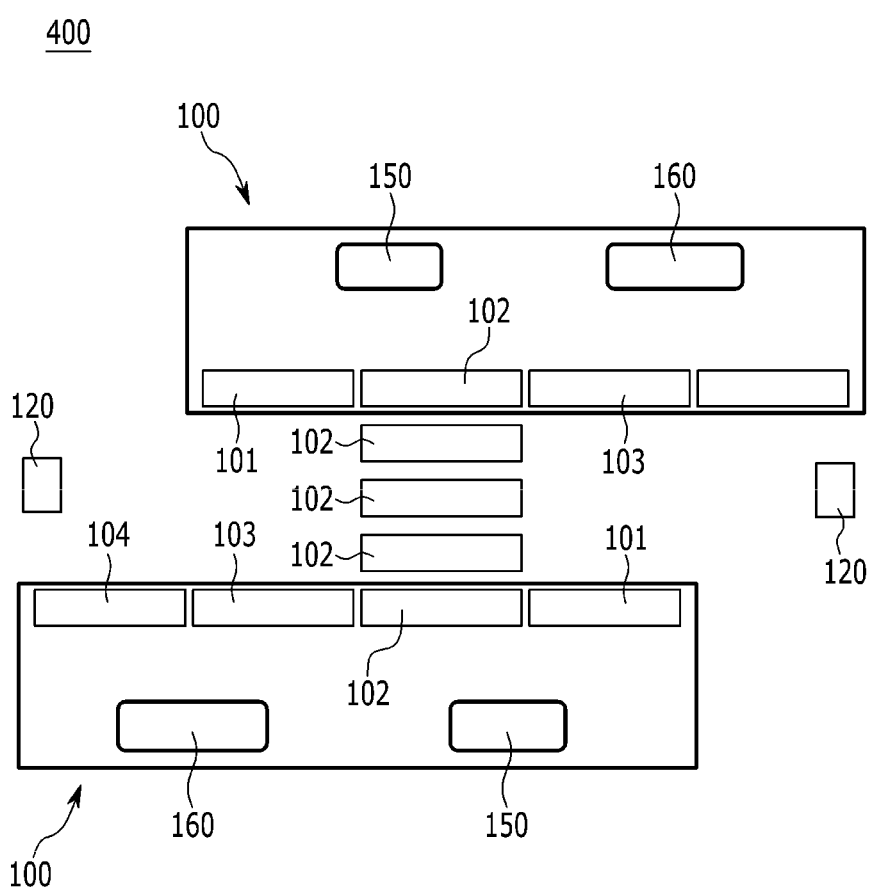
FIG. 8 shows a top plan view of an exemplary variation of FIG. 7.

FIG. 8 shows a top plan view of an exemplary variation of FIG. 7.

Referring to FIG. 3, FIG. 7, and FIG. 8, a system 400 for manufacturing and installing an electrode assembly corresponds to the structure shown in FIG. 7 except that the outlet 120 is installed on the respective sides of the space between the devices 100 for manufacturing an electrode assembly of two units. According to the above-noted configuration, the air gathered on the winding portion 130 may be more quickly discharged through the outlet 120.

Generation levels for respective diameters of foreign particles are examined in the space in which the device for manufacturing an electrode assembly according to the present invention is installed.

Example 1

The device for manufacturing an electrode assembly shown in FIG. 5 is installed in a closed and sealed space, the device for manufacturing an electrode assembly is operated for one hour while the air blower and the outlet are turned on, and the generation level of foreign particles in a range of radius that is within 50 centimeters in the winding portion is determined. Numbers of foreign particles with diameters that are 0.5 micrometers, 1 micrometer, 5 micrometers, 10 micrometers, and 25 micrometers are measured. The number of foreign particles is measured for the respective diameters a total of six times each minute, and their mean value is found. The number of foreign particles is measured by using a particle counter. The particle counter used in the present examination is an Aerosol Particle Counter Lasair III 310B manufactured by PMS.

Comparative Example 1

The number of foreign particles is measured in the same condition as Example 1 except that the device for manufacturing an electrode assembly is operated for an hour while the air blower and the outlet are turned off.

Comparative Example 2

In an external space, the number of environmental particles is measured at the height (corresponding to the height where the winding portion is positioned from the ground side) of about 1.5 meters from the ground side. Its measuring method is identical to that shown in Example 1.

TABLE 1

| | Number of measurements | Mean value of number of foreign particles for respective diameters (micrometers) | | | | | |
|---|---|---|---|---|---|---|---|
| | (number of times/minute) | 0.5 | 1 | 5 | 10 | 25 | Total number |
| Example 1 | 6 | 189 | 136 | 9 | 4 | 0 | 338 |
| Comparative Example 1 | 6 | 627,323 | 43,092 | 682 | 58 | 9 | 671,163 |
| Comparative Example 2 | 5 | 360,682 | 29,150 | 1,234 | 367 | 3 | 391,468 |

The total number of foreign particles in Example 1 is about 1/2000 compared to the total number of foreign particles of Comparative Example 1 to thus find that very few foreign particles are generated. Particularly, the number of foreign particles of 0.5 micrometers of Example 1 is found to be generated as 1/3300 compared to Comparative Example 1. The foreign particles of 0.5 micrometers are considered to be major foreign particles that cause a short circuit and a low voltage in the process for manufacturing an electrode assembly, and they are found to be efficiently removed in the space in which the device for manufacturing an electrode assembly according to the present invention is utilized.

When the number of foreign particles of 0.5 micrometers of Comparative Example 1 is compared to the number of foreign particles of 0.5 micrometers of Comparative Example 2, it is found that Comparative Example 1 generates about twice the foreign particles as Comparative Example 2. They are foreign particles generated in the process for operating the device for manufacturing an electrode assembly, and the foreign particles, as found from Example 1, are efficiently removed when the air blower and the outlet according to the present invention are operated.

Those of ordinary skill in the art to which the present invention belongs will be able to make various applications and modifications within the scope of the present invention.

INDUSTRIAL USABILITY

The device for manufacturing an electrode assembly according to the present invention may prevent the foreign particles from being input to the winding portion by purifying air in the space where the device for manufacturing an electrode assembly is installed.

The invention claimed is:

1. A device for manufacturing an electrode assembly for removing foreign particles through air circulation, the device comprising:
   a winding portion;
   an electrode transfer line;
   an air blower installed at a top portion of the device and configured to blow air to a bottom portion of the device; and
   an outlet disposed at the bottom portion and configured to discharge air blown to the bottom portion by the air blower.

2. The device of claim 1, wherein
the air blower is installed in a transfer direction of the electrode transfer line.

3. The device of claim 1, wherein
at least one additional air blower is installed to overlap the air blower in a direction crossing a transfer direction of the electrode transfer line and above the winding portion.

4. The device of claim 1, wherein
the outlet is installed below the electrode transfer line.

5. The device of claim 1, wherein
the outlet is installed at a lateral bottom end portion of the device.

6. A system for manufacturing and installing an electrode assembly, the system including:
   the device for manufacturing the electrode assembly of claim 1 provided in plurality, wherein the plurality of devices for manufacturing the electrode assembly includes a first device for manufacturing a first electrode assembly and a second device for manufacturing a second electrode assembly, and the first device and the second device are installed to face each other.

7. The system of claim 6, wherein
the air blower of the first device is configured to blow air to the winding portion of the first device and the air blower of the second device is configured to blow air to the winding portion of the second device and are installed to face each other at a front of the first and second devices, respectively.

8. The system of claim 7, wherein
at least one additional air blower is installed to overlap the air blower of the first device and the air blower of the second device in a direction crossing a transferring direction of the electrode transfer line of the first device and a transferring direction of the electrode transfer line of the second device.

9. The system of claim 6, wherein
an outlet is installed on respective sides of a space between the first device and the second device.

* * * * *